US009972963B2

(12) United States Patent
Nettleton et al.

(10) Patent No.: US 9,972,963 B2
(45) Date of Patent: May 15, 2018

(54) PROCESS USING A SINGLE CIRCULAR WEDGE PRISM FOR FINE ALIGNMENT OF A LASER CAVITY WITH A SINGLE-AXIS SCANNING ELEMENT AS THE OPTICAL Q-SWITCH

(71) Applicant: The United States of America, as represented by the Secretary of the Army, Washington, DC (US)

(72) Inventors: John E. Nettleton, Fairfax Station, VA (US); Nathaniel L. Hough, Fairfax Station, VA (US)

(73) Assignee: The United States of America, as represented by the Secretary of the Army, Washington, DC (US)

( * ) Notice: Subject to any disclaimer, the term of this patent is extended or adjusted under 35 U.S.C. 154(b) by 1080 days.

(21) Appl. No.: 14/231,830

(22) Filed: Apr. 1, 2014

(65) Prior Publication Data

US 2017/0201062 A1    Jul. 13, 2017

(51) Int. Cl.
*H01S 3/123*    (2006.01)
*H01S 3/08*    (2006.01)
*H01S 3/0941*    (2006.01)
*H01S 3/106*    (2006.01)

(52) U.S. Cl.
CPC .......... *H01S 3/123* (2013.01); *H01S 3/08004* (2013.01); *H01S 3/0941* (2013.01); *H01S 3/106* (2013.01)

(58) Field of Classification Search
CPC .......... H01S 3/121; H01S 3/123; H01S 3/125; H01S 3/08004
USPC ...................................... 372/14–16
See application file for complete search history.

(56) References Cited

U.S. PATENT DOCUMENTS

| | | | | | |
|---|---|---|---|---|---|
| 3,315,177 | A | * | 4/1967 | Benson | H01S 3/121 |
| | | | | | 372/107 |
| 4,740,986 | A | * | 4/1988 | Reeder | H01S 3/115 |
| | | | | | 359/834 |
| 6,501,772 | B1 | * | 12/2002 | Peterson | H01S 3/101 |
| | | | | | 372/10 |
| 2013/0259076 | A1 | * | 10/2013 | Roth | H01S 5/022 |
| | | | | | 372/43.01 |

* cited by examiner

*Primary Examiner* — Tod T Van Roy
(74) *Attorney, Agent, or Firm* — Ronald Krosky; Azza Jayaprakash

(57) ABSTRACT

The compact, laser cavity with a single-axis scanning element as the optical Q-switch incorporates all optical components required for a short-pulse laser. These optical components are 'locked' into alignment forming an optical laser cavity for diode laser or flash lamp pumping. The optical laser cavity does not need optical alignment after it is fabricated. Unfortunately, during the alignment process of the optical laser cavity there are small shifts due to the bonding process of the optical elements. These small shifts introduce alignment errors which results in a decrease in output energy and beam quality. The improvement presented adds a single circular wedge prism that corrects these alignment errors returning the output back to its optimum energy output and beam quality.

6 Claims, 4 Drawing Sheets

PROCESS USING A SINGLE CIRCULAR WEDGE PRISM FOR FINE ALIGNMENT OF A LASER CAVITY WITH A SINGLE-AXIS SCANNING ELEMENT AS THE OPTICAL Q-SWITCH

GOVERNMENT INTEREST

The invention described herein may be manufactured, used, sold, imported, and/or licensed by or for the Government of the United States of America.

FIELD OF THE INVENTION

This invention relates in general to short-pulse lasers, and more particularly, to improvements of the manufacturing process of the laser cavity with a single-axis scanning element as the optical Q-switch.

BACKGROUND OF THE INVENTION

Laser range finders are becoming an increasingly vital component in high precision targeting engagements for the military. The precise and accurate range to target information is an essential variable to the fire control equation of all future soldier weapons. This information is easily, and timely, provided by laser range finders.

A critical component of the military laser range finder is the laser source. Military laser range finders must have robust performance in severe conditions, not only poor weather but also battlefield conditions. A high power, compact, low cost laser source is required by military laser range finders. As an example, the Er:Yb:Glass laser cavity with a scanning element as the optical Q-switch that is a short-pulse, eye safe laser meets the requirements for the military laser range finder's laser source.

The laser cavity with a single-axis scanning element as the optical Q-switch makes the development/fabrication of a very low cost, compact, short range laser range finder feasible. For example, if the laser media is Er:Yb:Glass then the laser diode (or flash lamp) pump radiation is converted directly to the desired eye safe wavelength of about 1535 nm (an Optical Parametric Oscillator is not needed!). The quality of the output laser from a Er:Yb:Glass laser cavity is of generally very good quality and thus requires minimum sized optics for adequate collimation of the beam for use in a laser range finder system.

Regrettably, during the manufacturing/fabrication alignment process of the optical laser cavity of the laser cavity with a single-axis scanning element as the optical Q-switch, there are small angular shifts in the optical axis due to the bonding process of the optical elements. These small angular shifts to the optical axis introduce laser cavity alignment errors which results in a decrease in output energy and beam quality.

SUMMARY OF THE INVENTION

A new use of a single circular wedge prism that corrects alignment errors during the manufacturing build process of a laser cavity is disclosed. Various exemplary embodiments ensure that the optimum laser energy output and laser beam quality is retained.

In one aspect, a compact laser cavity is disclosed based on a single-axis scanning element. An exemplary compact laser cavity comprises a Q-switch based on the single-axis scanning element with its associated timing circuitry; a circular wedge prism having one optical surface facing the single-axis scanning element along an optical lasing path, and an opposite optical surface having a small angle of deviation respect to said optical lasing path; a laser gain media having one end facing said second optical surface and an output end along said optical lasing path; a pump source to pump radiation to said laser gain media; and an output coupler facing said output end along said optical lasing path.

In another aspect, a method of correcting alignment errors in a laser cavity is disclosed based on a circular-rotatable wedge prism. An exemplary method comprises the steps of configuring a basic laser cavity comprising a single-axis scanning element, a laser gain media and an output coupler along an optical path defined by the scanner element's scan axis, wherein said single-axis scanning element has associated timing electronics, and wherein a pump source is separately disposed to pump radiation to a side (side pumped) or end (end pumped) of said laser gain media to result in an output pulse emission as a laser output through said output coupler; disposing a circular-rotatable wedge prism held between the single-axis scanning element and the laser gain media to incrementally rotate said circular-rotatable wedge prism along said optical path, wherein one optical surface of said circular-rotatable wedge prism faces the single-axis scanning element, and a second optical surface of the circular-rotatable wedge prism approximately faces the laser gain media along said optical path, the second optical surface of the circular-rotatable wedge prism having a small angle of deviation; passively aligning the basic laser cavity configured with the circular-rotatable wedge prism based on a visible laser guide; and performing an active alignment of the laser cavity by actively firing the laser cavity from the pump source while rotating said circular-rotatable wedge prism in its held position to observe variations in the output pulse emissions and incrementally correct alignment errors initially introduced in the laser cavity to ascertain an optimum wedge rotation for optimum laser output and beam quality.

Yet, in another aspect, a circular wedge prism alignment of a laser cavity based on a single-axis scanning element is disclosed. An exemplary circular wedge prism alignment comprises the steps of configuring a basic laser cavity comprising a single-axis scanning element having a scanning surface, a laser gain media and an output coupler along an initial scan axis; rotatably disposing a circular wedge prism between the single-axis scanning element and the laser gain media along said initial scan axis; initially aligning the basic laser cavity with the circular wedge prism for initial output pulse energy and beam quality along said initial scan axis at a home rotation position; tilting the scanning surface of said single-axis scanning element away from its initial scan axis to reduce said output pulse energy; rotating the circular wedge prism from said home rotation position in one direction to observe peaking of said output pulse energy; and if the observed output pulse energy reduces, then the circular wedge prism is rotated in the opposite direction until a peak or maximum output pulse energy is obtained.

BRIEF DESCRIPTION OF THE DRAWINGS

Additional advantages and features will become apparent as the subject invention becomes better understood by reference to the following detailed description when considered in conjunction with the accompanying drawings wherein.

DETAILED DESCRIPTION

Figure 1:
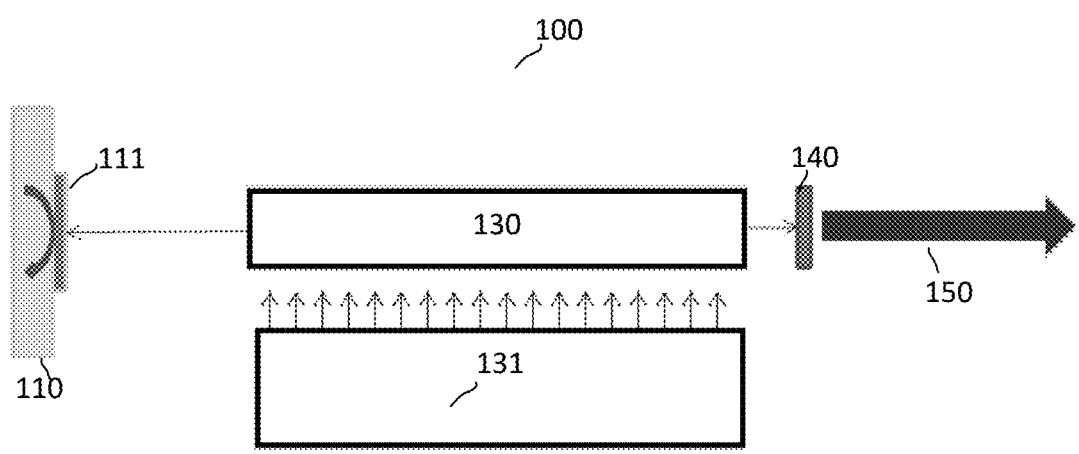
FIG. 1 shows a basic side pumped laser cavity with a single-axis scanning element as the optical Q-switch.

A basic laser cavity 100 with a single-axis scanning element as the optical Q-switch is shown in FIG. 1. The scanning element that serves as the optical Q-switch can be a simple mechanical resonant scanner, a MEMS (Micro-Electro-Mechanical-System) scanner, a rotating mirror (mirror mounted onto the shaft of a motor), or an electronic-scanned crystal. The concept of the scanning element optical Q-switch is simple. The scanning element 110, typically having a flat mirror 111, rapidly traverses the laser gain media 130 of the optical cavity, and aligns momentarily with the laser cavity's output coupler 140 (usually flat to very slight curvature) to produce a short, high power laser pulse 150.

The challenge with the basic laser cavity 100 is that a single-axis scanning element 110 must be precisely aligned to the output coupler 140 for the lasing event to occur. The scanning element's mirror 111 motion through its one axis guarantees that the one axis will be aligned at some point during the scan. The other axis, or cross-axis, alignment is obtained through fine adjustments to the scanning element 110, the laser gain media 130, and the output coupler 140. This is usually done using a visible laser as a guide during alignment and then actively firing the laser cavity as pumped from the pump source 131 while modifying the alignment to 'peak' the output 150. The optical components (e.g., 110, 130/131 and 140) are then bonded into place, typically using a low-shrinkage, UV-cured epoxy. But even the low-shrinkage epoxy will cause the precisely aligned optical elements to move during the curing.

The problem observed with the basic laser cavity 100 is that a slight movement during the cure process of the bond epoxy results in angular misalignment errors within the laser cavity. The angular misalignment error in the axis of the scanning element 110 scan direction is corrected by the scanner element and slight adjustment to timing electronics (one of the benefits of using a scanning element as the optical Q-switch), but the angular misalignment error in the cross-axis to the scanning element's scan direction remains uncorrected. These angular misalignment errors will cause the lasing output 150 to be reduced in power and reduced in beam quality.

Figure 2:
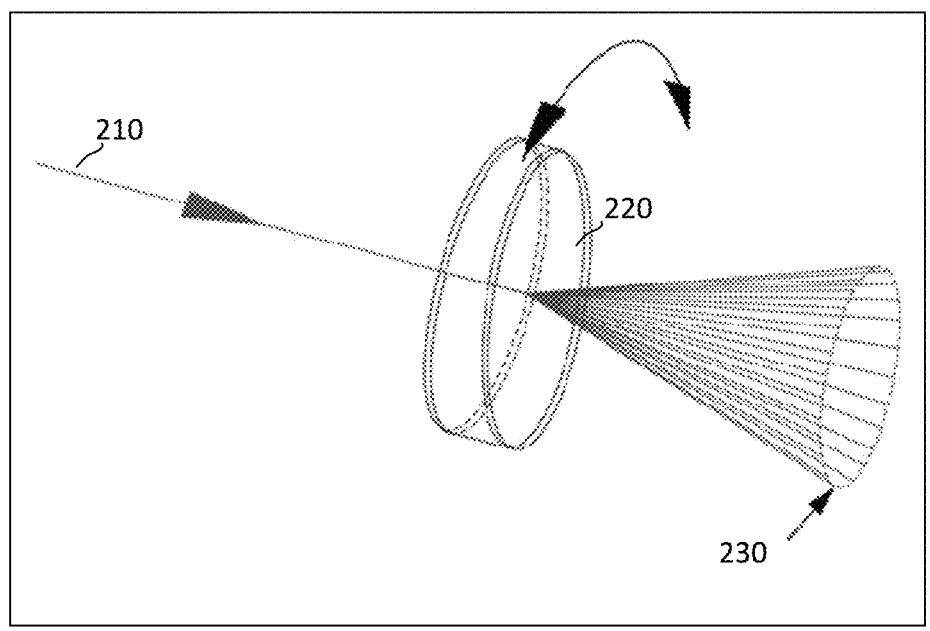
FIG. 2 shows an exemplary laser beam passing through a circular wedge prism and tracing a circle when the prism is rotated through 360 degrees.

Exemplary improvements to the alignment process are disclosed for manufacturing build of a laser cavity based on the use of a single circular wedge prism that corrects alignment errors introduced into the laser cavity, thus returning the laser output back to its optimum energy output and beam quality. FIG. 2 shows an exemplary laser beam 210 passing through an exemplary circular wedge prism 220 and tracing a circle 230 when the prism is rotated through 360 degrees. The circular wedge prism has a small angle of deviation that will have a laser beam traveling through it trace a 'circle' as the wedge prism is rotated 360 degrees as shown in FIG. 2.

Figure 3:
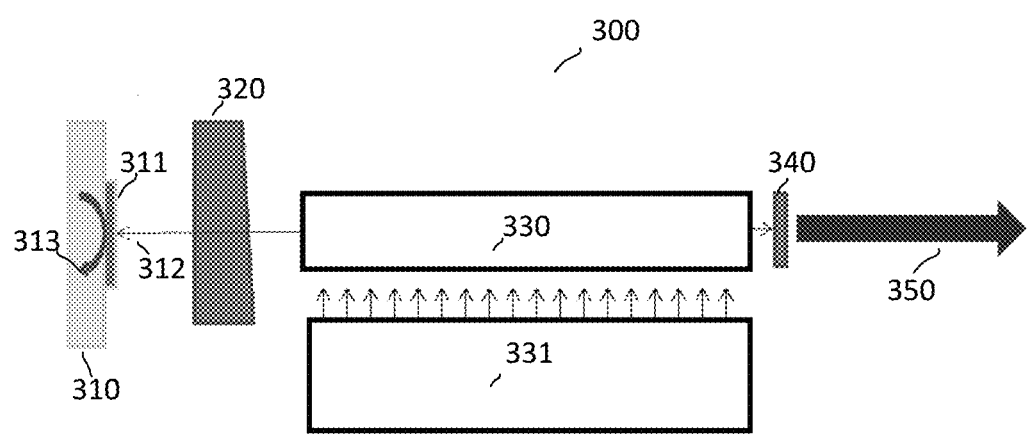
FIG. 3 shows an exemplary circular wedge prism inserted into the laser cavity with a single-axis scanning element as the optical Q-switch.

FIG. 3 shows an exemplary circular wedge prism inserted into the laser cavity 300 with a single-axis scanning element as the optical Q-switch. The exemplary circular wedge prism 320 is placed in the laser cavity 300 as shown in FIG. 3. The deviation angle of the circular wedge prism 320 is much smaller than the scanner element's scan angle and the surfaces of the circular wedge prism are coated with a very high anti-reflective coating at the lasing wavelength. Initial alignment of the laser cavity is done with the circular wedge prism 320 in its 'home position' which is when the maximum angular deviation introduced by the circular wedge prism is in the scanner element's scan axis. The angular deviation caused by the circular wedge prism 320 in the axis 312 of the scanner element's scan is readily offset by the scanning element 310 and a slight adjustment to the timing electronics (not shown) since the single-axis scanning element's scan angle 313 is much larger than the circular wedge prism's angular deviation.

After the optical elements (e.g., 310, 330 and 340), including the circular wedge prism 320, are aligned passively using a visible laser to guide the alignment, the laser cavity is actively aligned. Active alignment is based on actively firing the laser cavity (e.g., laser gain media 330) from the pump source 331 while rotating said circular wedge prism 320 in its held position to observe the variations in output pulse emission 350 and incrementally correcting alignment errors initially introduced in the laser cavity 300 to ascertain an optimum wedge rotation. The active alignment produces the optimal energy output 350 and beam quality. Once the optimal alignment is complete the optical elements are bonded in place (e.g., 310, 330/331 and 340), all except for the circular wedge prism 320. The circular wedge prism 320 allows the laser cavity 300 to be re-aligned or finely tuned to once again obtain the optimal output pulse energy 350 and beam quality after the optical elements have been permanently affixed.

The circular wedge prism 320 is left un-bonded so that it can be rotated in its holder. (See, an exemplary circular wedge prism held in FIG. 4.) This rotation causes angular deviations in the single-axis scanner element's scan axis and cross-axis. Again, the scanner element 310 and slight adjustments to the timing circuitry (not shown) will offset the circular wedge prism's angular deviation in the scan axis of the scanner element 310. But the cross-axis angular deviation of the circular wedge prism 320 will be used to offset any of the cross-axis misalignment caused by optical elements movements during the bonding process.

Once the optimal output pulse energy 350 and beam quality is obtained through the rotation of the circular wedge prism 320, the circular wedge prism is bonded in place. Any movement of the circular wedge prism 320 due to its bonding process is inconsequential because the wedge element needs to be rotated in order to deviate the laser path going through it. Lateral movements, as those introduced by the bonding process, will cause the beam to be only spatially displaced, not angularly displaced. The spatial displacements are very, very small, with respect to the overall laser beam size and has minimal, if any, impact on the laser output.

Advantages

The variously disclosed embodiments improve the manufacturing/ fabrication process of the laser cavity with a single-axis scanning element as the optical Q-switch. The quality and yield of the laser cavity with a scanning element as the optical Q-switch can be greatly increased thereby keeping costs of the laser source low which in turn keeps the cost of systems using the laser source low.

It may be possible to develop custom optical jigs and bonding processes to mitigate optical element movement but this is very time extensive and very costly. It would also be a fragile manufacturing process that can go wrong in so many places and rely on highly skilled technicians to perform the alignment. The introduction of a low cost circular wedge prism element into the laser cavity with a scanning element as the optical Q-switch is simple and very robust. The alignment process itself is very simple and would not require highly trained technicians to perform.

Alternative Features

Alternatively, other exemplary embodiments include configuring a pair of circular wedge prisms (a.k.a. Risley Prism or Risley Pair) into the laser cavity to correct both axis alignment errors. These other exemplary embodiments work very well, as each additional wedge prism corrects another axis of alignment error. Besides increasing cavity size, cost, and alignment complexity the addition of another wedge prism into the laser cavity doubles the amount of loss introduced into the cavity. The increase in intra-cavity loss can have severe impact to the laser cavity, especially if the laser media has very low gain, such as Er:Yb:Glass. The introduction of increased intra-cavity loss can cause the laser cavity to require a substantial increase in pump energy to overcome the intra-cavity loss to resume lasing conditions.

The variously exemplified laser cavity embodiment using a single circular wedge prism is a simple module that requires none of the labor extensive alignment procedures as current laser range finder solid state sources. No optical holders have to be fabricated, no complex engineering is required to design the optical cavity, and no precise laser cavity alignment(s) requiring expensive hardware, cameras, or custom jigs are needed. Production labor and material costs are greatly reduced while maintaining quality and robustness of the laser cavity.

The variously exemplified improved laser cavity embodiment can be characterized as a modular component. The modularity lends to ease of design for different pump sources. It can be incorporated in a flash lamp pumped or laser diode pumped system.

For all exemplary embodiments, the active laser medium can be, but are not limited to, Er:Yb:Glass, Nd:YAG, Nd:YLF or any of the numerous suitable laser materials.

Laboratory Setup

Figure 4:
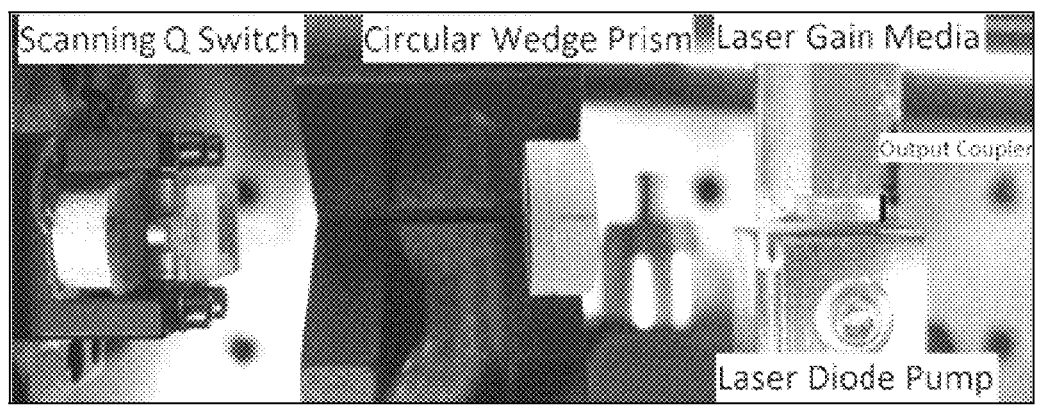
FIG. 4 depicts a laboratory setup of an exemplary embodiment used to validate the process using a single circular wedge prism for fine alignment of a laser cavity with a single-axis scanning element as the optical Q-switch.

FIG. 4 depicts a picture of a laboratory setup of an exemplary embodiment used to validate the process using a single circular wedge prism for fine alignment of a laser cavity with a single-axis scanning element as the optical Q-switch.

The single-axis scanning element is a mechanical, resonant scanner and serves as the Q-switch. The laser gain media is Er:Yb:Glass and the output coupler is set to be 92% reflective at the lasing wavelength of 1535 nm, or alternatively, about 80% to 98% reflective at a given lasing wavelength. Initially, the cavity is aligned for optimum output pulse energy and beam quality then the cavity is purposely 'mis-aligned' by tilting the scanner which reduces the output pulse energy. The circular wedge prism is then rotated in one direction while observing the output pulse energy. If the energy is reduced, the circular wedge prism is rotated in the opposite direction until a 'peak' or maximum output pulse energy is obtained.

This laboratory experiment demonstrated that the laser output pulse energy and beam quality of a laser cavity, with a single-axis scanning element as a Q-switch, could be recovered through use of a single circular wedge prism.

Applications

The variously disclosed exemplary embodiments may be used in the laser source in very compact laser range finders for the military or the commercial market. For example: the use of Er:Yb:Glass as the laser gain media generates eye safe laser output for eye safe laser range finding. These laser range finders have both military and commercial applications (such as hunting, commercial shipping, and sport sailing). The compact design of the improved laser cavity also lends itself to placement in other laser-based portable/hand-held laser based devices. These may be medical devices, industrial tools or scientific equipment that would benefit from the size/weight reduction, dependable performance, and low cost.

It is obvious that many modifications and variations of the present invention are possible in light of the above teachings. It is therefore to be understood that within the scope of the appended claims, the invention may be practiced otherwise than as described.

What is claimed is:

1. A circular wedge prism alignment of a laser cavity based on a single-axis scanning element, comprising the steps of:
configuring the laser cavity comprising the single-axis scanning element having a scanning surface, a laser gain media and an output coupler along an initial scan axis;
rotatably disposing a circular wedge prism between the single-axis scanning element and the laser gain media along said initial scan axis;
initially aligning the laser cavity with the circular wedge prism for initial output pulse energy and beam quality along said initial scan axis at a home rotation position;
tilting the scanning surface of said single-axis scanning element away from its initial scan axis to reduce said output pulse energy;
rotating the circular wedge prism from said home rotation position in one direction to observe peaking of said output pulse energy; and
if the observed output pulse energy reduces, then the circular wedge prism is rotated in the opposite direction until a peak or maximum output pulse energy is obtained.

2. The circular wedge prism alignment of a laser cavity according to claim 1, wherein one optical surface of said circular wedge prism faces the single-axis scanning element, and a second optical surface of the circular-rotatable wedge prism faces the laser gain media.

3. The circular wedge prism alignment of a laser cavity according to claim 1, wherein a pump source is separately disposed to pump radiation to said laser gain media to result in an output pulse emission as a laser output through said output coupler.

4. A system, comprising:
a configuration component that configures a laser cavity comprising a single-axis scanning element having a scanning surface, a laser gain media and an output coupler along an initial scan axis;
a disposition component that rotatably disposes a circular wedge prism between the single-axis scanning element and the laser gain media along said initial scan axis;
an alignment component that initially aligns the laser cavity with the circular wedge prism for initial output pulse energy and beam quality along said initial scan axis at a home rotation position;

a tilt component that tilts the scanning surface of said single-axis scanning element away from its initial scan axis to reduce said output pulse energy;

a rotation component that rotates the circular wedge prism from said home rotation position in one direction to observe peaking of said output pulse energy; and if the observed output pulse energy reduces, then the circular wedge prism is rotated in the opposite direction until a peak or maximum output pulse energy is obtained.

5. The system of claim 4, wherein one optical surface of the circular wedge prism faces the single-axis scanning element and a second optical surface of the circular-rotatable wedge prism faces the laser gain media.

6. The system of claim 4, wherein a pump source is separately disposed to pump radiation to the laser gain media to result in an output pulse emission as a laser output through said output coupler.

* * * * *